United States Patent
Liu et al.

(10) Patent No.: US 10,438,590 B2
(45) Date of Patent: Oct. 8, 2019

(54) VOICE RECOGNITION

(71) Applicant: Lenovo (Beijing) Co., Ltd., Beijing (CN)

(72) Inventors: Shuyong Liu, Beijing (CN); Yuanyi Zhang, Beijing (CN); Hongwei Li, Beijing (CN)

(73) Assignee: LENOVO (BEIJING) CO., LTD., Beijing (CN)

(*) Notice: Subject to any disclaimer, the term of this patent is extended or adjusted under 35 U.S.C. 154(b) by 0 days.

(21) Appl. No.: 15/806,016

(22) Filed: Nov. 7, 2017

(65) Prior Publication Data

US 2018/0190295 A1 Jul. 5, 2018

(30) Foreign Application Priority Data

Dec. 31, 2016 (CN) .......................... 2016 1 1265979

(51) Int. Cl.
*G10L 15/32* (2013.01)
*G10L 15/22* (2006.01)
*G10L 15/30* (2013.01)
*G10L 15/01* (2013.01)

(52) U.S. Cl.
CPC ............. *G10L 15/32* (2013.01); *G10L 15/22* (2013.01); *G10L 15/01* (2013.01); *G10L 15/30* (2013.01); *G10L 2015/225* (2013.01)

(58) Field of Classification Search
USPC .................................. 704/246, 247, 251, 252
See application file for complete search history.

(56) References Cited

U.S. PATENT DOCUMENTS

| 9,601,107 B2* | 3/2017 | Okamoto ................ G10L 15/06 |
| 2005/0010422 A1* | 1/2005 | Ikeda ...................... G10L 15/30 704/277 |
| 2012/0232893 A1* | 9/2012 | Lee ......................... G10L 15/30 704/231 |
| 2013/0124197 A1* | 5/2013 | Lee ......................... G10L 15/30 704/201 |
| 2014/0058729 A1* | 2/2014 | Nagatomo .............. G10L 15/30 704/235 |
| 2016/0351185 A1* | 12/2016 | Lin ......................... G10L 17/04 |
| 2017/0053651 A1* | 2/2017 | Lim ........................ G10L 15/32 |
| 2017/0140751 A1* | 5/2017 | Huang .................... G10L 15/08 |

FOREIGN PATENT DOCUMENTS

| CN | 1351744 A | 5/2002 |
| CN | 1633679 A | 6/2005 |
| CN | 1882015 A | 12/2006 |
| CN | 104795069 A | 7/2015 |
| CN | 104823235 A | 8/2015 |

* cited by examiner

*Primary Examiner* — Leonard Saint Cyr
(74) *Attorney, Agent, or Firm* — Anova Law Group, PLLC

(57) ABSTRACT

A method for voice recognition includes acquiring a sound input, obtaining a plurality of feedback results from a plurality of recognition engines different from each other, and determining a recognition result of the sound input based on the plurality of feedback results.

20 Claims, 8 Drawing Sheets

US 10,438,590 B2

VOICE RECOGNITION

CROSS-REFERENCES TO RELATED APPLICATIONS

This application claims priority to Chinese Patent Application No. 201611265979.0, filed on Dec. 31, 2016, the entire contents of which are incorporated herein by reference.

TECHNICAL FIELD

The present disclosure relates to the field of information processing technology and, more particularly, to methods, systems, and media for voice recognition.

BACKGROUND

With the development and popularity of electronic products, electronic products have more and more functions, powerful performance, and rich experience, which bring a lot of convenience to people's lives. In the same time, user requirements of electronic products, such as convenience, etc., are becoming higher and higher. In order to meet the users' higher demand for electronic products, intelligent electronic devices can have automatic operation functions based on user's voice input.

However, different users may have different languages, different regional accents, and/or different speaking habits. Further, different voice recognition servers may have different voice recognition effects for a same voice input. The existing voice recognition equipment generally uses a single voice recognition server, which may cause semantic parsing errors. Such semantic parsing errors can result in corresponding operation errors, causing inefficient work and poor user experience.

SUMMARY

One aspect of present disclosure provides a method for voice recognition. The method includes acquiring a sound input, obtaining a plurality of feedback results from a plurality of recognition engines different from each other, and determining a recognition result of the sound input based on the plurality of feedback results.

Another aspect of the present disclosure provides a system for voice recognition. The system includes a hardware processor, and a memory storing instructions for execution by the hardware processor to acquire a sound input, obtain a plurality of feedback results from a plurality of recognition engines different from each other, and determine a recognition result of the sound input based on the plurality of feedback results.

Another aspect of the present disclosure provides a non-transitory computer-readable medium storing computer-executable instructions for execution by a hardware processor to acquire a sound input, obtain a plurality of feedback results from a plurality of recognition engines different from each other, and determine a recognition result of the sound input based on the plurality of feedback results.

BRIEF DESCRIPTION OF THE DRAWINGS

Various objectives, features, and advantages of the present disclosure can be more fully appreciated with reference to the detailed description of embodiments in connection with the following drawings, in which same reference numerals refer to the same or like elements unless otherwise specified. The following drawings are merely examples for illustrative purposes according to various disclosed embodiments and are not intended to limit the scope of the present disclosure.

DETAILED DESCRIPTION

Embodiments of the disclosure will be described in detail with reference to the accompanying drawings. The following description is made only by way of example, but does not limit the present disclosure. Various embodiments of the present disclosure and various features in the embodiments that do not conflict with each other can be combined and rearranged in various ways. Without departing from the spirit and scope of the present disclosure, modifications, equivalents, or improvements to the present disclosure are conceivable to those skilled in the art and are intended to be encompassed within the scope of the present disclosure.

In accordance with various embodiments, the present disclosure provides methods, systems, and media for voice recognition.

Figure 1:
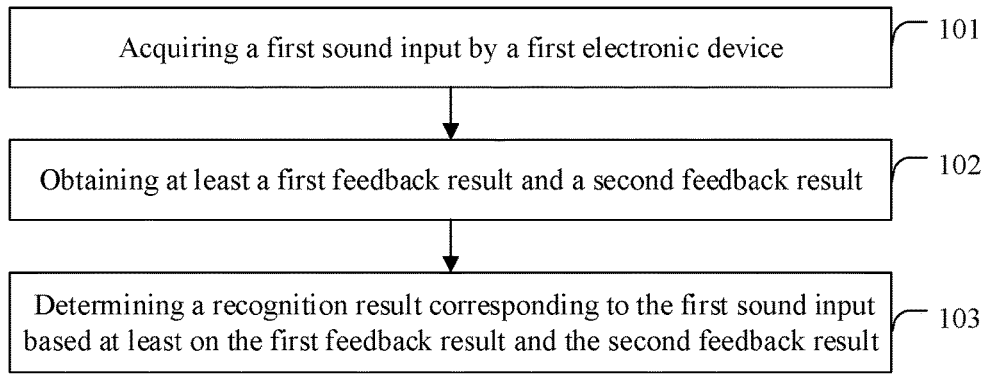
FIG. 1 illustrates a schematic flow diagram of an example of method for voice recognition in accordance with the present disclosure.

FIG. 1 shows a schematic flow diagram of an example of method for voice recognition in accordance with the present disclosure. As shown in FIG. 1, at 101, a first sound input is acquired by a first electronic device. The first electronic device may be an intelligent terminal capable of performing a corresponding operation by identifying a user's voice input. For example, the first electronic device can be a smart TV, a smart playback system, a smart refrigerator, a smart air conditioner, or any other suitable smart home appliance. The first voice input may be a voice control command issued by the user when using the smart appliance with a voice control.

At 102, at least a first feedback result and a second feedback result are obtained based on the first sound input.

The first feedback result can be obtained by a first recognition engine. The first recognition engine can recognize the first voice input to generate the first feedback result. The second feedback result can be obtained by a second recognition engine. The second recognition engine can recognize the first voice input to generate the second feedback result. The second recognition engine can be different from the first recognition engine.

Specifically, the first feedback result and the second feedback result may be obtained by the first electronic device. The first feedback result and the second feedback result may be the same or different. The first feedback result and the second feedback result can be generated by different recognition engines respectively based on the first sound input entered by the user.

At 103, a recognition result corresponding to the first sound input is determined based at least on the first feedback result and the second feedback result.

Specifically, the first electronic device can determine the recognition result corresponding to the first sound input based on at least the first feedback result and the second feedback result. After obtaining the first feedback result and the second feedback result of the first sound input, the first electronic device can analyze and process the first feedback result and the second feedback to determine a correct recognition result corresponding to the first sound input. As such, a semantic recognition to the first sound input can be realized to obtain the original voice information of the first user sound input.

Accordingly, in the disclosed method for voice recognition, a first electronic device can acquire a first sound input, and obtain at least a first feedback result and a second feedback result based on the first sound input. The first feedback result can be obtained through recognizing the first voice input by a first recognition engine. The second feedback result can be obtained through recognizing the first voice input by a second recognition engine. The second recognition engine can be different from the first recognition engine. A recognition result corresponding to the first sound input can be determined at least based on the first feedback result and the second feedback result.

As such, the first electronic device can obtain multiple feedback results by recognizing the first voice input using multiple recognition engines. A semantic recognition of the first sound input can be determined based on the multiple feedback results, instead of a single feedback result from a single recognition engine.

Therefore, the problem of semantic parsing errors caused by using a single voice recognition service can be solved. That is, the disclosed method can improve the accuracy of semantic recognition, ensure the validity of the operation corresponding to the semantic recognition, improve the work efficiency, and increase the interaction degree between the user and the electronic device.

Figure 2:
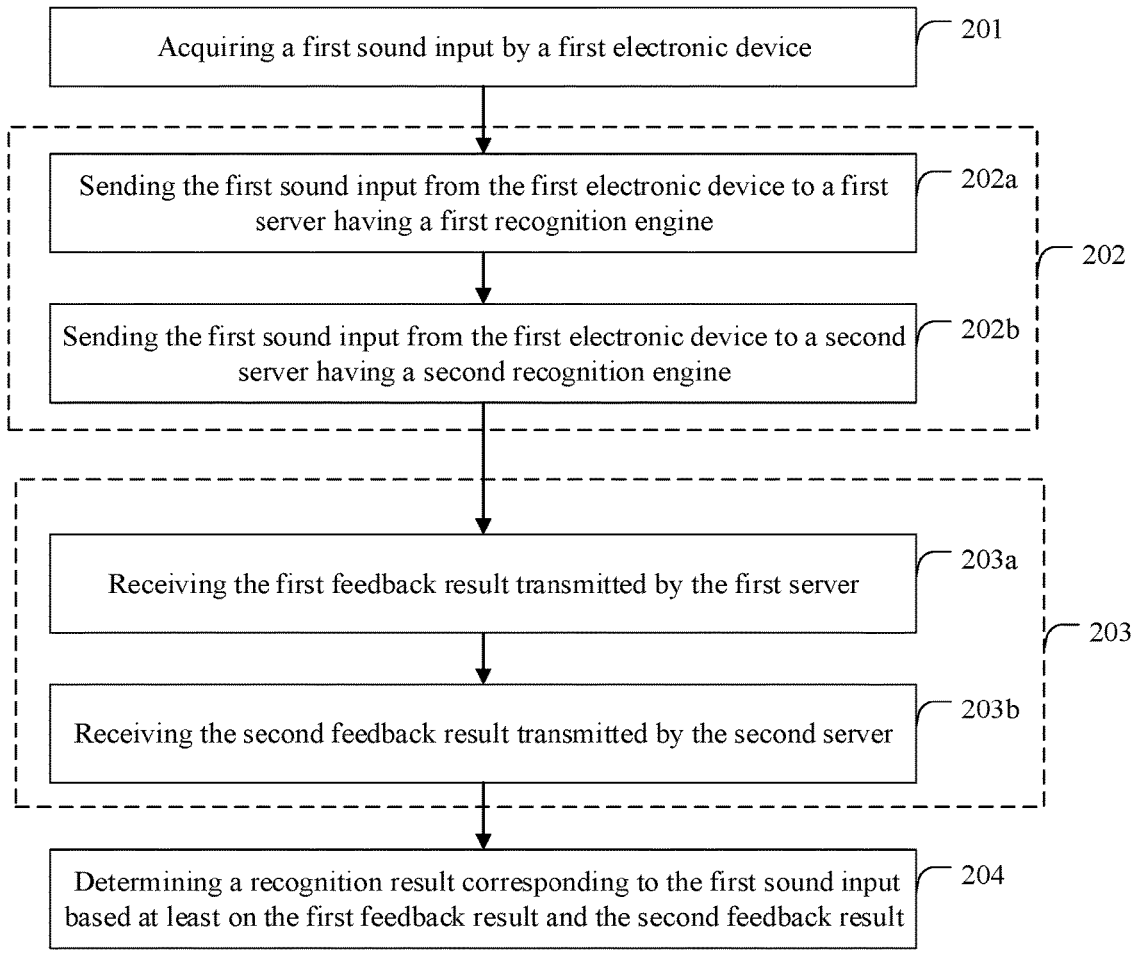
FIG. 2 illustrates a schematic flow diagram of another example of method for voice recognition in accordance with the present disclosure.

FIG. 2 is a schematic flow diagram of another example of method for voice recognition in accordance with the present disclosure. As shown in FIG. 2, at 201, the first electronic device acquires a first sound input.

At 202, the first electronic device sends the first sound input to one or more servers. In some embodiments, sending the first sound input to the one or more servers can include the following.

At 202a, the first electronic device sends the first sound input to a first server including a first recognition engine.

At 202b, the first electronic device sends the first sound input to a second server including a second recognition engine.

Specifically, the first recognition engine and the second recognition engine can run on different servers. That is, the first recognition engine may run on the first server, and the second recognition engine may run on the second server. The first server is different from the second server.

In some other embodiments, the first recognition engine can run on a suitable server other than the first server, and the second recognition engine can run on a suitable server other than the second server, as long as the first recognition engine and the second recognition engine run on different servers.

In some embodiments, the first electronic device does not semantically recognize the first sound input, but transmits the first sound input to the first server and the second server. The first recognition engine on the first server and the second recognition engine on the second server can recognize the first sound input. In some other embodiments, the first sound input can be sent to a single server, which includes both of the first recognition engine and the second recognition engine.

At 203, the first electronic device receives a first feedback result and a second feedback result transmitted from the one or more servers. In some embodiments, receiving the first and second feedback results includes the following.

At 203a, the first electronic device receives the first feedback result transmitted by the first server. The first feedback result can be obtained by the first recognition engine on the first server. The first recognition engine can recognize the first voice input to generate the first feedback result.

At 203b, the first electronic device receives the second feedback result transmitted by the second server. The second feedback result can be obtained by the second recognition engine on the second server. The second recognition engine can recognize the first voice input to generate the second feedback result. The second recognition engine can be different from the first recognition engine. The first recognition engine can be different from the second recognition engine.

At 204, the first electronic device determines a recognition result corresponding to the first sound input based at least on the first feedback result and the second feedback result.

Specifically, the first electronic device can determine the recognition result corresponding to the first sound input based on at least the first feedback result and the second feedback result. After obtaining the first feedback result and the first feedback result of the first sound input, the first electronic device can analyze and process the first feedback result and the second feedback to determine a correct recognition result corresponding to the first sound input. As such, a semantic recognition of the first sound input can be realized to obtain original voice information of the first user sound input.

Accordingly, in the disclosed method for voice recognition, a first electronic device can acquire a first sound input, and obtain at least a first feedback result and a second feedback result based on the first sound input. The first feedback result can be obtained through recognizing the first voice input by a first recognition engine. The second feedback result can be obtained through recognizing the first voice input by a second recognition engine. The second recognition engine can be different from the first recognition engine. A recognition result corresponding to the first sound input can be determined at least based on the first feedback result and the second feedback result.

As such, the first electronic device can obtain multiple feedback results obtained through recognizing the first voice input by multiple recognition engines. A semantic recognition of the first sound input can be determined based on the multiple feedback results, instead of a single feedback result from a single recognition engine.

Therefore, the problem of semantic parsing errors caused by using a single voice recognition service can be solved. That is, the disclosed method can improve the accuracy of semantic recognition, ensure the validity of the operation corresponding to the semantic recognition, improve the work efficiency, and increase the interaction degree between the user and the electronic device.

Figure 3:
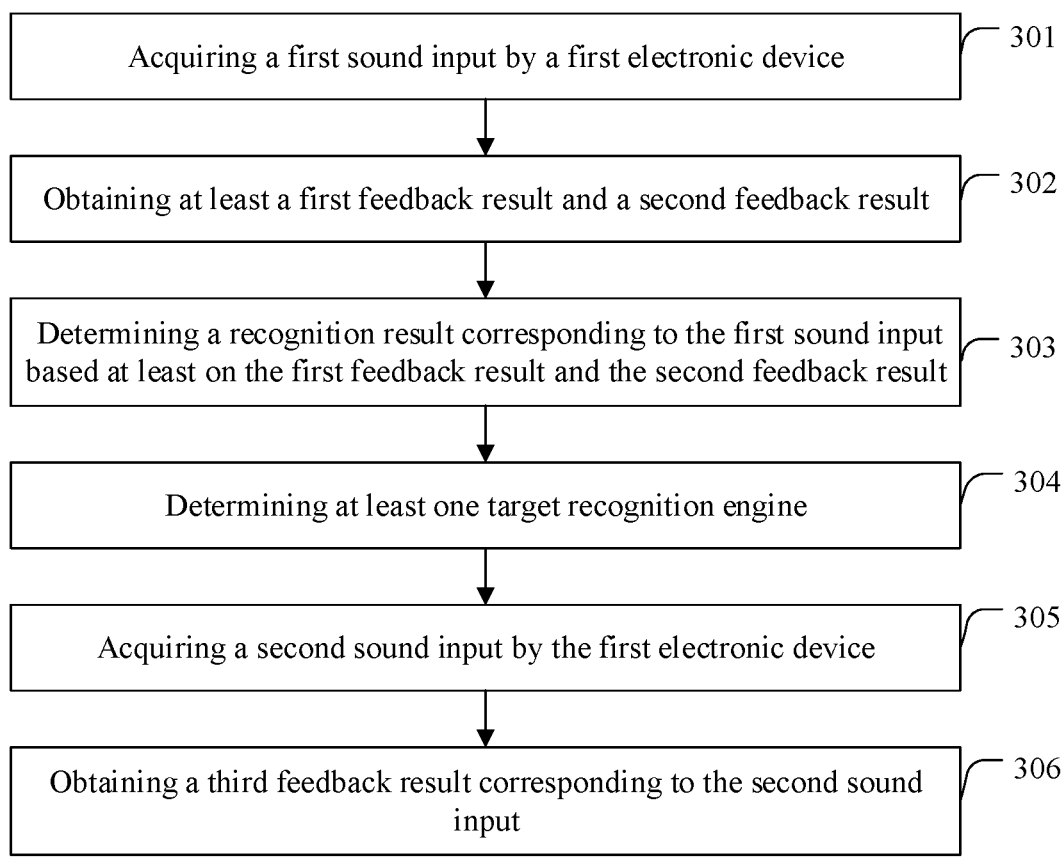
FIG. 3 illustrates a schematic flow diagram of another example of method for voice recognition in accordance with the present disclosure.

FIG. 3 shows a schematic flow diagram of another example of method for voice recognition in accordance with the present disclosure. As shown in FIG. 3, at 301, the first electronic device acquires a first sound input.

At step 302, the first electronic device obtains at least a first feedback result and a second feedback result.

At 303, the first electronic device determines a recognition result corresponding to the first sound input based at least on the first feedback result and the second feedback result.

At 304, the first electronic device determines at least one target recognition engine.

A number of the at least one target recognition engine is less than a number of recognition engines for recognizing the first sound input. Specifically, a training process can be applied to multiple recognition engines by using the processes 301-303. Based on the training result, one or more target recognition engines that are capable of obtaining correct semantic recognition of the voice input can be determined as the at least one target recognition engine.

At 305, the first electronic device acquires a second sound input.

The second sound input can be different from the first sound input. The first sound input can include sound information used in the training process for obtaining the one or more target recognition engines by training the multiple recognition engines. The second voice input can include user voice information used in actual operation of the first electronic device, e.g., a smart home appliance device. For example, the second voice input can be a user voice command for controlling the first electronic device. The first sound input and the second sound input can be acquired by a voice acquiring device of the first electronic device, which may include a microphone or any other suitable acoustic sensor, etc.

At 306, the first electronic device obtains a third feedback result corresponding to the second sound input.

The third feedback result can be generated by the one or more target recognition engines. The one or more target recognition engines can recognize the second sound input and determine the third feedback result corresponding to a recognition result of the second sound input.

Specifically, the one or more target recognition engine can semantically recognize the second sound input to obtain the third feedback result. The third feedback result can be the correct semantic recognition result corresponding to the second sound input.

Accordingly, in the disclosed method for voice recognition, a first electronic device can acquire a first sound input, and obtain at least a first feedback result and a second feedback result based on the first sound input. The first feedback result can be obtained through recognizing the first voice input by a first recognition engine. The second feedback result can be obtained through recognizing the first voice input by a second recognition engine. The second recognition engine can be different from the first recognition engine. A recognition result corresponding to the first sound input can be determined at least based on the first feedback result and the second feedback result.

As such, the first electronic device can obtain multiple feedback results obtained through recognizing the first voice input by multiple recognition engines. A semantic recognition to the first sound input can be determined based on the multiple feedback results, instead of a single feedback result from a single recognition engine.

Therefore, the problem of semantic parsing errors caused by using a single voice recognition service can be solved. That is, the disclosed method can improve the accuracy of semantic recognition, ensure the validity of the operation corresponding to the semantic recognition, improve the work efficiency, and increase the interaction degree between the user and the electronic device.

In some embodiments, the determination of the one or more target recognition engines may include the following process.

The first electronic device can share the identification information and the auxiliary information of the one or more target recognition engines with a second electronic device. The second electronic device can determine a matching recognition engine according to identification information and auxiliary information of the one or more target recognition engines, and auxiliary information of the second electronica device.

Specifically, after determining the one or more target recognition engines through the training process, the first electronic device can obtain the identification information and the auxiliary information of the one or more target recognition engines. The first electronic device can send the identification information and the auxiliary information of the one or more target recognition engines to the second electronic device. The second electronic device may also perform operation through voice control.

Based on the auxiliary information of the one or more target recognition engines, the second electronic device can determine at least one target recognition engine that matches the auxiliary information of the second electronic device, and can access the target recognition engine based on the identification information corresponding to the target recognition engine. Therefore, the second electronic device can use the target recognition engine corresponding to the identification information to semantically recognize the sound input, thereby performing one or more operations corresponding to the sound input.

In some embodiments, the auxiliary information of the second electronic device can include geographical information, e.g., a location associated with the second electronic device, such as Shaanxi, Beijing, Shanghai, or any other suitable location information.

Figure 4:
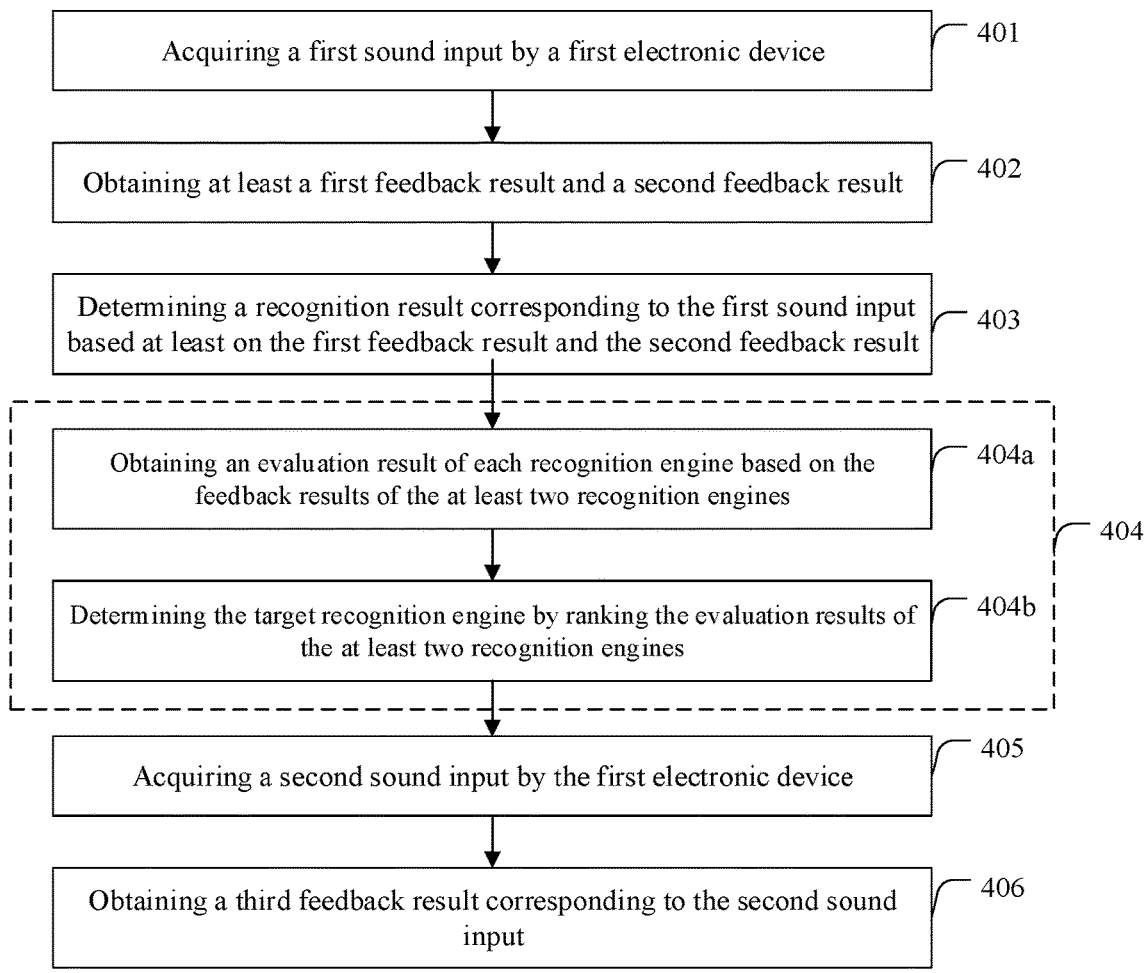
FIG. 4 illustrates a schematic flow diagram of another example of method for voice recognition in accordance with the present disclosure.

FIG. 4 shows a schematic flow diagram of another example of method for voice recognition in accordance with the present disclosure. As shown in FIG. 4, at 401, the first electronic device acquires a first sound input.

At 402, the first electronic device obtains at least a first feedback result and a second feedback result.

At 403, the first electronic device determines a recognition result corresponding to the first sound input based at least on the first feedback result and the second feedback result.

At 404, the first electronic device determines at least one target recognition engine by analyzing the recognition result based on an engine determination strategy.

The recognition result can be determined based at least on two feedback results. A number of target recognition engines can be less than a number of recognition engines for recognizing the first sound input.

The engine determination strategy can include a set of rules that can be used to analyze the feedback results of the sound input to determine the one or more target recognition engines. For example, the engine determination strategy may include evaluating the multiple recognition engines based on the feedback results of the sound input generated by the multiple recognition engines, respectively, and determining the at least one target recognition engine based on the evaluation result.

In some embodiments, determining the at least one target recognition engine, i.e., process 404, can include the following.

At 404a, the first electronic device obtains an evaluation result of each of the at least two recognition engines based on the feedback results of the at least two recognition engines corresponding to the sound input.

The evaluation result can be used to rank the at least two recognition engines to obtain the at least one target recognition engine.

In some embodiments, the evaluation result of a recognition engine may be a rating of the recognition engine. After acquiring the first sound input sent by the user, i.e., a test sound input for the training process to obtain the target recognition engine, the at least two recognition engines can be used to recognize the first sound input. The feedback results generated by different recognition engines can be obtained. The evaluation results, e.g., ratings, of the at least two recognition engines can be obtained based on the feedback results.

In some embodiments, the training process can be performed during a user's use of the recognition engines for controlling smart home appliance. In some other embodiments, the training process can be performed in a testing process before the user uses the smart home appliance.

At 404b, the first electronic device determines the at least one target recognition engine by ranking the evaluation results of the at least two recognition engines.

In some embodiments, multiple feedback results corresponding to multiple sound inputs sent by one or more users can be generated by the at least two recognition engines. The at least two evaluation engines can be evaluated based on each of the multiple feedback results. That is, multiple times of evaluation or rating can be performed to each of the at least two recognition engines.

After a certain preset time of the training process, the at least two recognition engines can be ranked according to the rating of each recognition engine. As one example, the certain preset time can be one month.

In some embodiments, the ratings of the multiple recognition engines can be ranked in a descending order. The first ranked recognition engine can be selected as the target recognition engine. In some other embodiments, the top ranked several recognition engines may be selected as the target recognition engines. The selected target recognition engines can be shared with other electronic devices. Each of the other electronic devices may select one of the shared target recognition engines that matches a location of the electronic device as the final target recognition engine.

At 405, the first electronic device acquires a second sound input.

At 406, the first electronic device can obtain a third feedback result corresponding to the second sound input.

The third feedback result can be generated by the one or more target recognition engines. The one or more target recognition engines can recognize the second sound input and determine the third feedback result corresponding to a recognition result of the second sound input.

Figure 5:
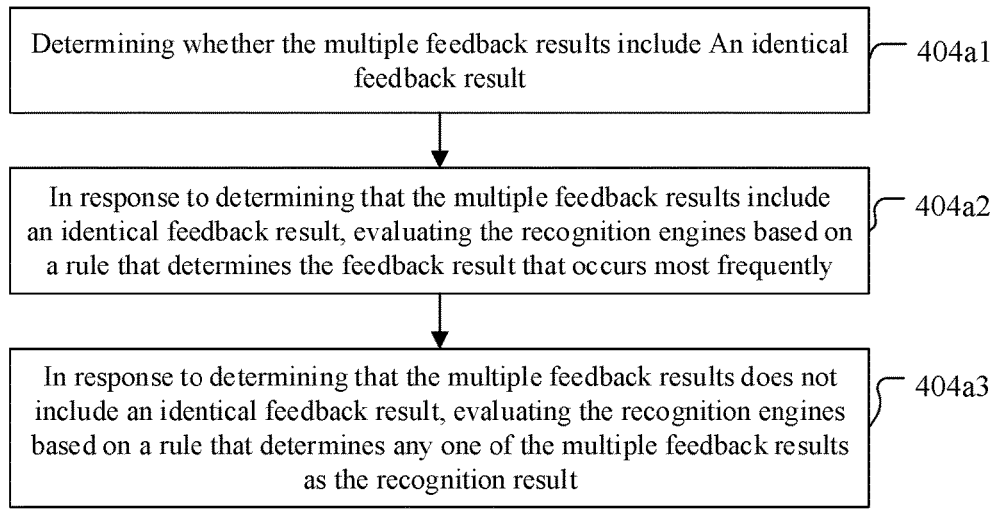
FIG. 5 illustrates a schematic flow diagram of an example of method for obtaining an evaluation result of each of at least two recognition engines.

FIG. 5 shows a schematic flow diagram of an example of method for obtaining the evaluation result of each of the at least two recognition engines, i.e., process 404a in FIG. 4. As shown in FIG. 5, at 404a1, the first electronic device determines whether the multiple feedback results include an identical feedback result.

At 404a2, in response to determining that the multiple feedback results include the identical feedback result, the first electronic device evaluates the recognition engines according to a rule that determines the feedback result that occurs most frequently, i.e., the feedback result having the largest number of occurrence times, as the recognition result, to obtain the evaluation result of each of the recognition engines. In this disclosure, if feedback results obtained by different recognition engines are identical to each other, these different recognition engines are considered to have obtained an "identical feedback result." Further, the number of recognition engines that have obtained the identical feedback result is referred to as the number of occurrence times of the identical feedback result, or a "corresponding number of the identical feedback result."

Specifically, a scenario involving three recognition engines is described below as an example. Whether the feedback results generated by the three recognition engines of a training sound input have an identical feedback result is determined. If there is one identical feedback result, the identical feedback result can be determined as the recognition result of the training voice input. The three recognition engines can be evaluated based on the recognition result.

If there are multiple identical feedback results, the feedback result having the largest corresponding number can be determined as the recognition result of the training voice input. For example, if the corresponding number of a first identical feedback result is three and the corresponding number of a second identical feedback result is two, then the first feedback result can be determined as the recognition result.

In some embodiments, the evaluation of a recognition engine corresponding to a recognition result may include a positive evaluation to the recognition engine that matches the recognition result (a "matching recognition engine"), such as increasing the rating of the matching recognition engine. The positive evaluation method may take a relatively long time, but the determined target recognition engine can have a relatively high recognition accuracy. Thus, the positive evaluation can be suitable for a scenario that allows a long training time process.

In some other embodiments, the evaluation of a recognition engine corresponding to a recognition result may include a combined evaluation including a positive evaluation to the recognition engine that matches the recognition result and a negative evaluation to the recognition engine that does not match the recognition result. For example, the rating of the recognition engine that matches the recognition result can be increased, and the rating of the recognition engine that does not match the recognition result can be decreased. A final rating of a recognition engine can be obtained based on multiple evaluations corresponding to multiple recognition results. The combined evaluation may take a relatively short time, but the determined target recognition engine may have a relatively low recognition accuracy. Thus, the combined evaluation can be suitable for a scenario with limited training time.

At 404$a$3, in response to determining that the multiple feedback results do not include an identical feedback result, the first electronic device evaluates the recognition engines according to a rule that determines any one of the multiple feedback results as the recognition result, to obtain the evaluation result of each of the recognition engines.

Specifically, if all feedback results generated by the recognition engines are not same, an arbitrary feedback result can be determined as the recognition result. The recognition result can be used as a basis to evaluate the recognition engines. In some other embodiments, processes 404$a$4-404$a$6 described below in connection with FIG. 10 can be used in combination with the above arbitrary determination method to evaluate the recognition engines. Specifically, whether a modification instruction from the user is received within a preset time period can be determined. If so, the feedback result indicated by the modification instruction is determined as the recognition result, and the rating of the corresponding recognition engine is increased. Otherwise, a randomly-selected feedback result is determined to be the recognition result, and the rating of the corresponding recognition engine is increased.

Figure 6:
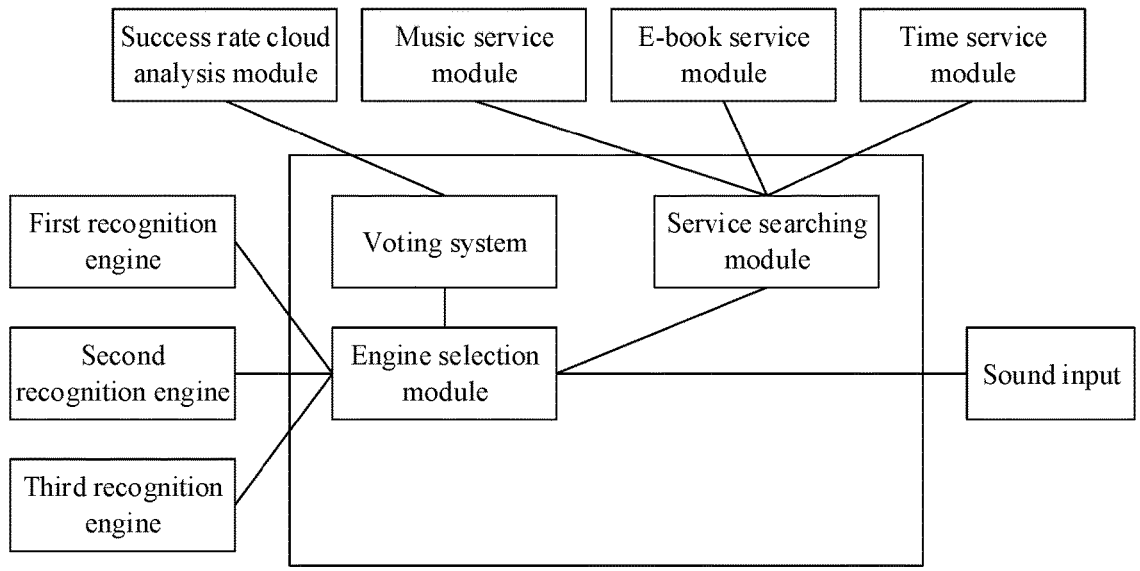
FIG. 6 illustrates a schematic structure diagram of an example of system for voice recognition in accordance with the present disclosure.

FIG. 6 shows a schematic structure diagram of an example of system for voice recognition in accordance with the present disclosure. The disclosed methods for voice recognition can be implemented in the system for voice recognition shown in FIG. 6. In some embodiments, the system may include a success rate cloud analysis module, a music service module, an e-book service module, a timing service module, a voting system, a service searching module, an engine selection module, a first recognition engine, a second recognition engine, a third recognition engine, and a voice input module.

In the following, an example considering a training sound input "Songzi" is described in connection with FIGS. 7-9, which illustrate schematic diagrams of examples of feedback results of voice recognition engines.

Figure 7:
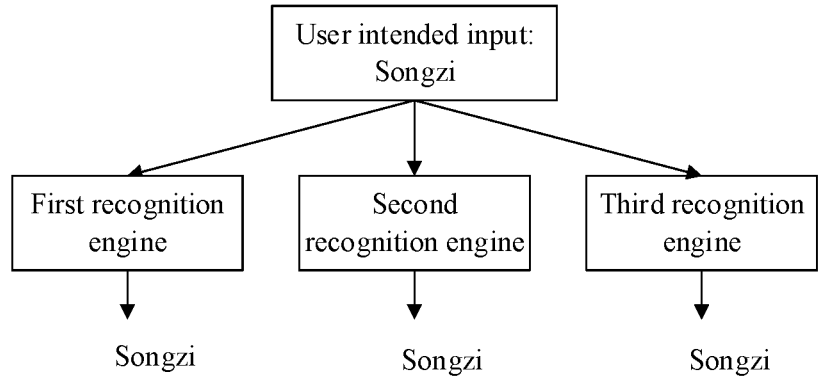
FIG. 7 illustrates a schematic diagram of examples of feedback results of voice recognition engines in accordance with the present disclosure.

As shown in FIG. 7, the first recognition engine, the second recognition engine, and the third recognition engine are used to recognize the training sound input "Songzi," and the feedback results of all three recognition engines are "Songzi." It can be determined that the recognition result is "Songzi." The rating of each of the three recognition engines can be increased by one point.

Figure 8:
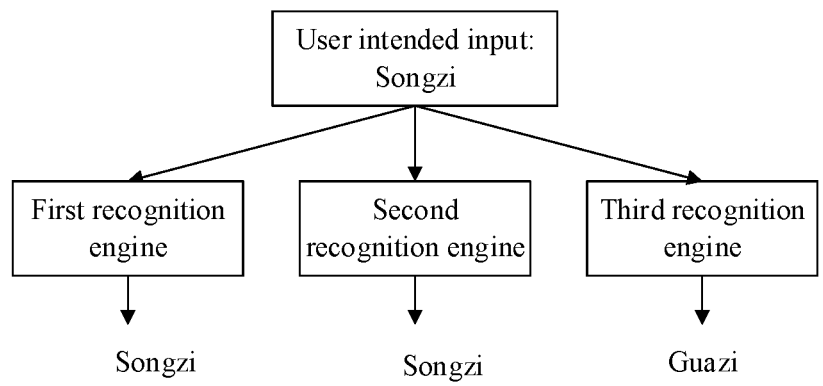
FIG. 8 illustrates a schematic diagram of examples of feedback results of voice recognition engines in accordance with the present disclosure.

As shown in FIG. 8, the first recognition engine, the second recognition engine, and the third recognition engine are used to recognize the training sound input "Songzi.". The feedback results of the first recognition engine and the second recognition engine are "Songzi," but the feedback result of the third recognition engine is "Guazi." It can be determined that the recognition result is "Songzi." The rating of each of the first recognition engine and the second recognition engine can be increased by one point.

Figure 9:
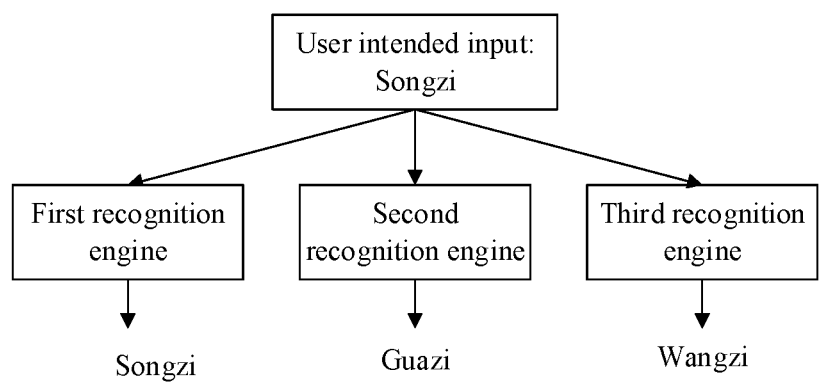
FIG. 9 illustrates a schematic diagram of examples of feedback results of voice recognition engines in accordance with the present disclosure.

As shown in FIG. 9, the first recognition engine, the second recognition engine, and the third recognition engine are used to recognize the training sound input "Songzi." The feedback result of the first recognition engine is "Songzi." The feedback result of the second recognition engine is "Guazi." The feedback result of the third recognition engine is "Wangzi." Since the feedback results of the three recognition engines are all different, it can be randomly determined that the recognition result is "Songzi." Thus, the rating of the first recognition engine can be increased by one point. In some embodiments, whether a modification instruction from the user is received within a preset time period, such as one minute, can be determined. If, for example, a modification instruction that indicates the second recognition engine, then the recognition result is changed to the feedback result of the second recognition engine, and the rating of the second recognition engine is increased by one point. Otherwise, the feedback result of the first recognition engine is determined to be the recognition result, and the rating of the first recognition engine is increased by one point.

Figure 10:
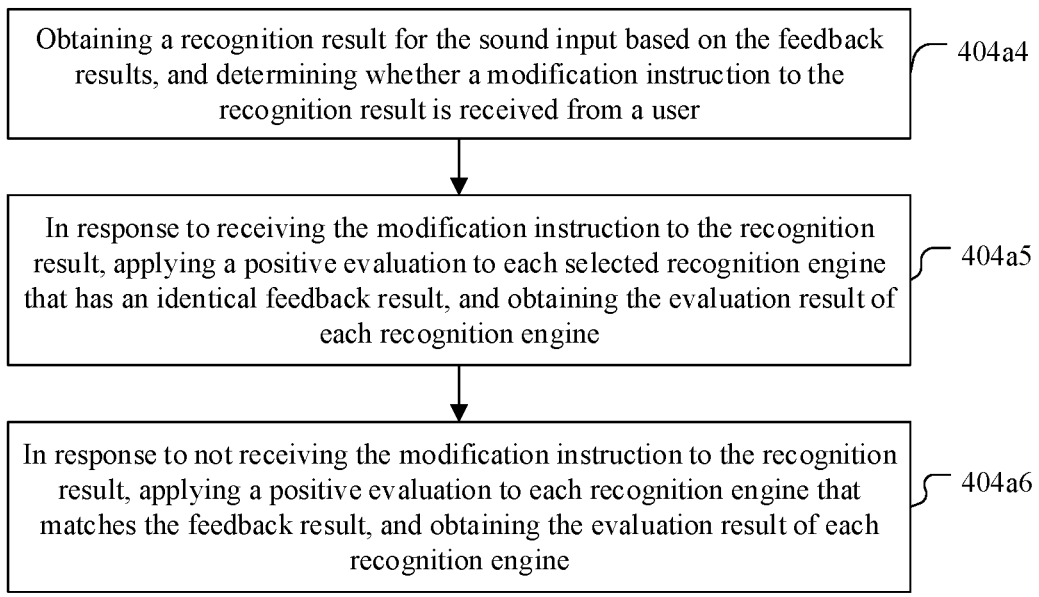
FIG. 10 illustrates a schematic flow diagram of another example of method for obtaining an evaluation result of each of at least two recognition engines.

FIG. 10 shows a schematic flow diagram of another example of method for obtaining the evaluation result of each of the at least two recognition engine, i.e., process 404$a$ in FIG. 4. As shown in FIG. 10, at 404$a$4, the first electronic device obtains a recognition result for the sound input based on the feedback results, and determines whether a modification instruction with respect to the recognition result is received from a user.

At 404$a$5, in response to receiving the modification instruction, the first electronic device applies a positive evaluation to each selected recognition engine that has an identical feedback result, and obtains the evaluation result of each recognition engine.

At 404$a$6, in response to not receiving the modification instruction, the first electronic device applies a positive evaluation to each recognition engine that matches the feedback result, and obtains the evaluation result of each recognition engine.

Referring again to FIG. 9, the first recognition engine, the second recognition engine, and the third recognition engine are used to recognize the training sound input "Songzi." The feedback result of the first recognition engine is "Songzi." The feedback result of the second recognition engine is "Guazi." The feedback result of the third recognition engine is "Wangzi." Since the feedback results of the three recognition engines are all different, it can be randomly determined that the recognition result is "Songzi." Further, it can be determined whether a modification instruction from a user has been received within a predetermined time period, e.g., one minute. For example, in response to receiving a modification instruction designating that "Wangzi" is a user selected recognition result, the rating of the third recognition engine can be increased by one point. Otherwise, in response to not receiving a modification instruction within the predetermined time period, the rating of the first recognition engine can be increased by one point.

In some embodiments, the recognition result of the sound input can be determined based on a modification instruction submitted by the user. In response to receiving the modification instruction from a user's input for the recognition result of the sound input, a selected feedback result indicated by the modification instruction can be used as the recognition result of the sound input, and each recognition engine that matches the recognition result can be positively evaluated. In response to not receiving the modification instruction with respect to the recognition result, the feedback result can be randomly selected, and each recognition engine that matches the recognition result can be positively evaluated. As such, the evaluation result of each recognition engine can be obtained.

In some embodiments, if a single target recognition engine is to be determined finally, the recognition engines may be ranked after each evaluation process of the recognition engines. The difference between the rating of the first-ranked, i.e., top-ranked, recognition engine and the rating of the second-ranked, i.e., the next-to-top-ranked, recognition engine can be determined. The evaluation process can be repeated until the difference is larger than a first preset threshold value. For example, if the rating of the first-ranked recognition engine is ten times or more of the rating of the second-ranked recognition engine, the evaluation processes of the recognition engines can be stopped. The multiple recognition engines can be ranked based on the total ratings of the recognitions engines obtained as described above to determine the target recognition engine.

In some other embodiments, if multiple target recognition target engines are to be determined finally, the recognition engines may be ranked after each evaluation process of the recognition engines. For example, if three target recognition target engines are to be determined, the difference between the rating of the third-ranked recognition engine and the rating of the fourth-ranked recognition engine can be determined. The evaluation process can be repeated until the difference is larger than a second preset threshold value. For example, if the rating of the third-ranked recognition engine is ten times or more of the rating of the fourth-ranked recognition engine, the evaluation processes of the recognition engines can be stopped. The multiple recognition engines can be ranked based on the total ratings of the recognitions engines obtained as described above to determine the top three recognition engines as the target recognition engines.

In some other embodiments, the evaluation process to each recognition engine can be performed for a predetermined time. The multiple recognition engines can be ranked based on the total ratings of the recognition engines obtained after the predetermined time. A number of target recognition engines can be determined based on the total ratings of the recognitions engines. For example, all recognition engines having a rating higher than a third preset threshold value (e.g., 80) can be determined as the target recognition engines.

Accordingly, in the disclosed method for voice recognition, a first electronic device can acquire a first sound input, and obtain at least a first feedback result and a second feedback result based on the first sound input. The first feedback result can be obtained through recognizing the first voice input by a first recognition engine. The second feedback result can be obtained through recognizing the first voice input by a second recognition engine. The second recognition engine can be different from the first recognition engine. A recognition result corresponding to the first sound input can be determined at least based on the first feedback result and the second feedback result.

As such, the first electronic device can obtain multiple feedback results by recognizing the first voice input using multiple recognition engines. A semantic recognition of the first sound input can be determined based on the multiple feedback results, instead of a single feedback result from a single recognition engine.

Therefore, the problem of semantic parsing errors caused by using a single voice recognition server can be solved. That is, the disclosed method can improve the accuracy of semantic recognition, ensure the validity of the operation corresponding to the semantic recognition, improve the work efficiency, and increase the interaction degree between the user and the electronic device.

Figure 11:
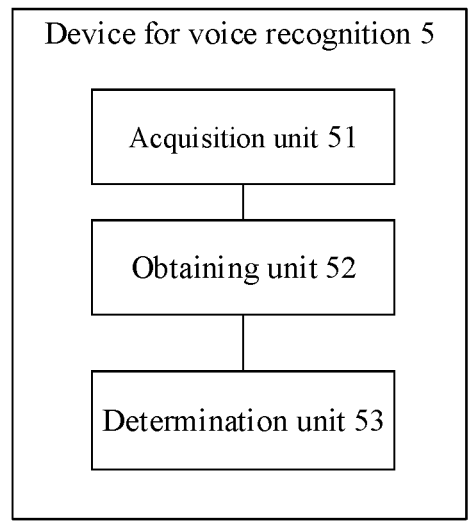
FIG. 11 illustrates a schematic diagram of an example of device for voice recognition in accordance with the present disclosure.

FIG. 11 shows a schematic diagram of an example of device 5 for voice recognition in accordance with the present disclosure. The device 5 can be used to perform a voice recognition method consistent with the disclosure, such as one of the examples of voice recognition method described above in connection with FIGS. 1-5 and 10. As shown in FIG. 11, the device 5 includes an acquisition unit 51, an obtaining unit 52, and a determination unit 53.

The acquisition unit 51 can be used for acquiring a first sound input.

The obtaining unit 52 can be used for obtaining at least a first feedback result and a second feedback result based on the first sound input.

The first feedback result can be obtained by a first recognition engine. The second feedback result can be obtained by a second recognition engine. The second recognition engine can be different from the first recognition engine.

The determination unit 53 can be used for determining a recognition result corresponding to the first sound input based at least on the first feedback result and the second feedback result.

Accordingly, the disclosed device for voice recognition can acquire a first sound input, and obtain at least a first feedback result and a second feedback result based on the first sound input. The first feedback result can be obtained by recognizing the first voice input using a first recognition engine. The second feedback result can be obtained by recognizing the first voice input using a second recognition engine. The second recognition engine can be different from the first recognition engine. A recognition result corresponding to the first sound input can be determined at least based on the first feedback result and the second feedback result.

As such, the device for voice recognition can obtain multiple feedback results by recognizing the first voice input using multiple recognition engines. A semantic recognition of the first sound input can be determined based on the multiple feedback results, instead of a single feedback result from a single recognition engine.

Therefore, the problem of semantic parsing errors caused by using a single voice recognition server can be solved. That is, the disclosed method can improve the accuracy of semantic recognition, ensure the validity of the operation corresponding to the semantic recognition, improve the work efficiency, and increase the interaction degree between the user and the electronic device.

Figure 12:
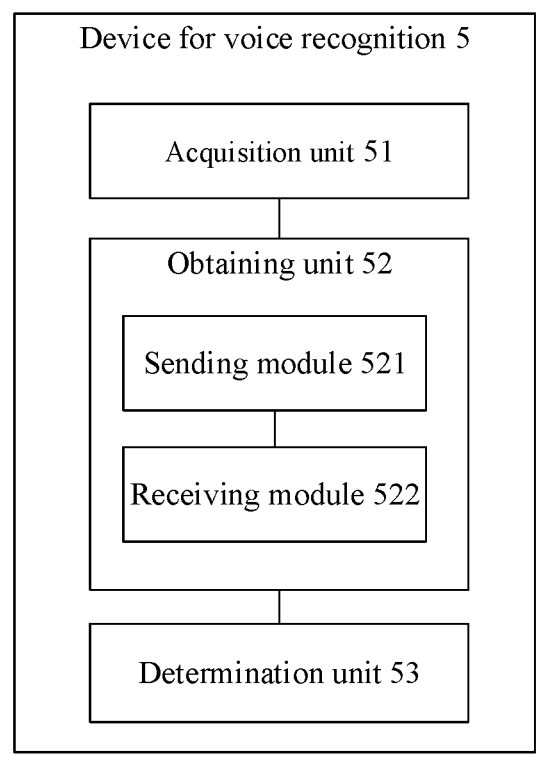
FIG. 12 illustrates a schematic diagram showing further details of the device in FIG. 11.

FIG. 12 shows further details of the device 5. As shown in FIG. 12, the obtaining unit 52 includes a sending module 521 and a receiving module 522.

The sending module 521 can be used for sending the first sound input to one or more servers.

The receiving module 522 can be used for receiving the first feedback result and the second feedback result transmitted by the one or more servers.

Further, the sending module 521 can be configured for sending the first sound input to a first server having a first recognition engine, and sending the first sound input to a second server having a second recognition engine. The first server can be different from the second server.

Correspondingly, the receiving module 522 can be used for receiving the first feedback result transmitted by the first server, and receiving the second feedback result transmitted by the second server. The first feedback result can be obtained by the first recognition engine on the first server.

The first recognition engine can recognize the first voice input to generate the first feedback result. The second feedback result can be obtained by the second recognition engine on the second server. The second recognition engine can recognize the first voice input to generate the second feedback result. The second recognition engine can be different from the first recognition engine.

Further, the determination unit 53 can also be used for determining at least one target recognition engine.

The number of target recognition engines can be smaller than the number of recognition engines for recognizing the first sound input.

The acquisition unit 51 can also be used for acquiring a second sound input.

The obtaining unit 53 can also be used for obtaining a third feedback result for the second sound input.

The third feedback result is obtained by the target recognition engine recognizing the second sound input, and the third feedback result corresponds to the recognition result of the second sound input.

In some embodiments, the determination unit 53 can be used for determining at least one target recognition engine by analyzing the recognition result based on an engine determination strategy.

The recognition result can be determined based at least on two feedback results.

Figure 13:
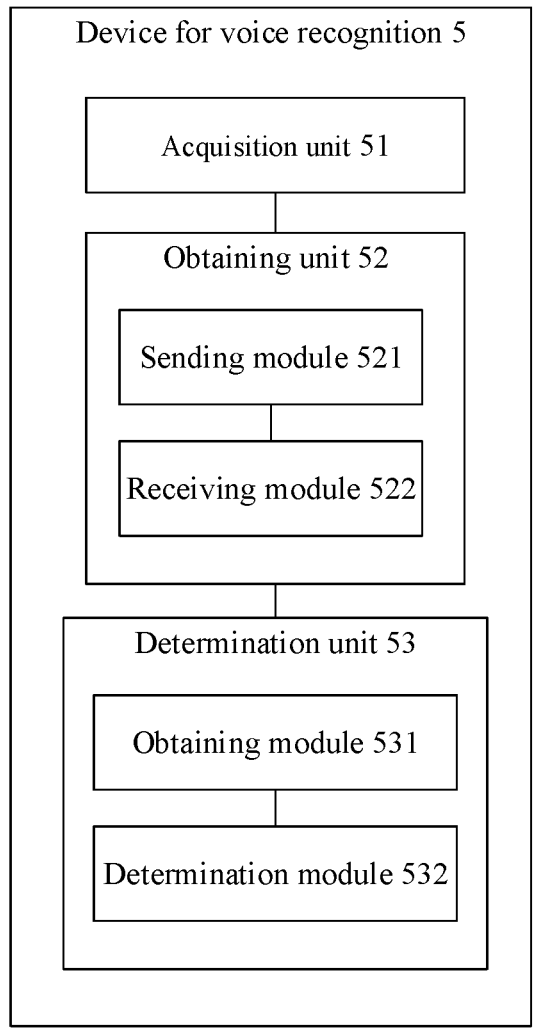
FIG. 13 illustrates a schematic diagram showing further details of the device in FIG. 11.

FIG. 13 shows further details of the device 5. As shown in FIG. 13, the determination unit 53 includes an obtaining module 531 and a determination module 532.

The obtaining module 531 can be used for obtaining an evaluation result of each recognition engine based on the feedback result of the at least two recognition engines corresponding to the sound input.

The evaluation result can include a ranking of the at least two recognition engines. The evaluation result can be used to obtain the one or more target recognition engines.

The determination module 532 can be used for determining the at least one target recognition engines by ranking the evaluation results of the at least two recognition engines.

Further, in some embodiments, the obtaining module 531 can be used for determining whether the multiple feedback results include an identical feedback result. In response to determining that the multiple feedback results include the identical feedback result, the obtaining module 531 can evaluate the recognition engines based on a rule that determines the identical feedback result having a largest corresponding number as the recognition result, to obtain the evaluation result of each recognition engine.

In response to determining that the multiple feedback results do not include an identical feedback result, the obtaining module 531 can evaluate the recognition engines based on a rule that determines any one of the multiple feedback results as the recognition result, to evaluate the recognition engines.

In some embodiments, the obtaining module 531 can obtain a recognition result for the sound input based on the feedback results, and can determine whether a modification instruction with respect to the recognition result is received from a user. In response to receiving the modification instruction, the obtaining module 531 can apply a positive evaluation to a selected recognition engine that has an identical feedback result, to obtain the evaluation result of each recognition engine. In response to not receiving the modification instruction, the obtaining module 531 can apply a positive evaluation to each recognition engine that matches the recognition result, to obtain the evaluation result of each recognition engine.

In some embodiments, the determination unit 53 can be further used for sharing identification information and auxiliary information of the one or more target recognition engines with a second electronic device. As such, the second electronic device can determine a matching recognition engine according to the identification information and the auxiliary information of the one or more target recognition engines, and the auxiliary information of the second electronica device.

It should be noted that, the interactions between the units and modules are similar to the interactive procedure in the disclosed methods for voice recognition described above in connection with FIGS. 1-5 and 10, and detailed description thereof is omitted.

Accordingly, the disclosed device for voice recognition can acquire a first sound input, and obtain at least a first feedback result and a second feedback result based on the first sound input. The first feedback result can be obtained by recognizing the first voice input using a first recognition engine. The second feedback result can be obtained by recognizing the first voice input using a second recognition engine. The second recognition engine can be different from the first recognition engine. A recognition result corresponding to the first sound input can be determined at least based on the first feedback result and the second feedback result.

As such, the device for voice recognition can obtain multiple feedback results by recognizing the first voice input using multiple recognition engines. A semantic recognition of the first sound input can be determined based on the multiple feedback results, instead of a single feedback result from a single recognition engine.

Therefore, the problem of semantic parsing errors caused by using a single voice recognition server can be solved. That is, the disclosed method can improve the accuracy of semantic recognition, ensure the validity of the operation corresponding to the semantic recognition, improve the work efficiency, and increase the interaction degree between the user and the electronic device.

Figure 14:
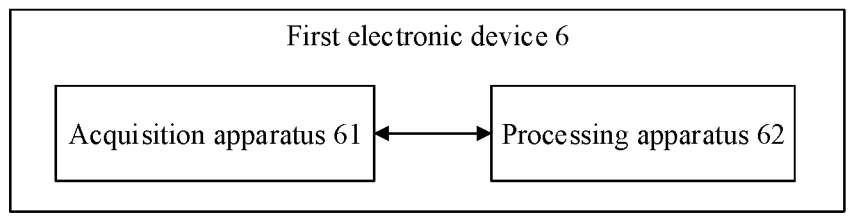
FIG. 14 illustrates a schematic hardware diagram of an example of electronic device in accordance with the present disclosure.

FIG. 14 shows a schematic diagram of an example of electronic device 6 in accordance with the present disclosure. The electronic device 6 can be used to implement any one of the disclosed methods for voice recognition described above in connection with FIGS. 1-5 and 10. As shown in FIG. 14, the electronic device 6 includes an acquisition apparatus 61 and a processing apparatus 62.

The acquisition apparatus 61 can be used for acquiring a first sound input.

The processing apparatus 62 can be used for determining a recognition result of the first sound input based on at least a first feedback result and a second feedback result.

The first feedback result can be obtained by a first recognition engine. The second feedback result can be obtained by a second recognition engine. The second recognition engine can be different from the first recognition engine.

It should be noted that, the interactions between the acquisition apparatus and the processing apparatus are similar to the interactive procedure in the disclosed methods for voice recognition described above in connection with FIGS. 1-5 and 10, and thus detailed description thereof is omitted.

Accordingly, the disclosed electronic device can acquire a first sound input, and obtain at least a first feedback result and a second feedback result based on the first sound input. The first feedback result can be obtained by recognizing the first voice input using a first recognition engine. The second feedback result can be obtained by recognizing the first voice input using a second recognition engine. The second recognition engine can be different from the first recognition engine. A recognition result corresponding to the first sound input can be determined at least based on the first feedback result and the second feedback result.

As such, the device for voice recognition can obtain multiple feedback results by recognizing the first voice input using multiple recognition engines. A semantic recognition of the first sound input can be determined based on the multiple feedback results, instead of a single feedback result from a single recognition engine.

Therefore, the problem of semantic parsing errors caused by using a single voice recognition server can be solved. That is, the disclosed method can improve the accuracy of semantic recognition, ensure the validity of the operation corresponding to the semantic recognition, improve the work efficiency, and increase the interaction degree between the user and the electronic device.

In practical implementations, the acquisition unit 51, the obtaining unit 52, the determination unit 53, the sending module 521, the receiving module 522, the obtaining module 531, and the determination module 532 may be implemented using a central processing unit (CPU), a microprocessor unit (MPU), a digital signal processor (DSP), or a field programmable gate array (FPGA) associated with a wireless data transmission apparatus.

It should be noted that, the flowcharts and block diagrams in the figures illustrate various embodiments of the disclosed method, media and system, as well as architectures, functions and operations that can be implemented by a computer program product. In this case, each block of the flowcharts or block diagrams may represent a module, a code segment, a portion of program code. Each module, each code segment, and each portion of program code can include one or more executable instructions for implementing predetermined logical functions.

It should also be noted that, in some alternative implementations, the functions illustrated in the blocks be executed or performed in any order or sequence not limited to the order and sequence shown and described in the figures. For example, two consecutive blocks may actually be executed substantially simultaneously where appropriate or in parallel to reduce latency and processing times, or even be executed in a reverse order depending on the functionality involved in.

It should also be noted that, each block in the block diagrams and/or flowcharts, as well as the combinations of the blocks in the block diagrams and/or flowcharts, can be realized by a dedicated hardware-based system for executing specific functions, or can be realized by a dedicated system combined by hardware and computer instructions.

The disclosure also provides a computer program product that includes computer-readable storage medium storing program codes. The program code includes instructions for performing the disclosed method. For specific implementations of the disclosed method, reference can made to the various embodiments described above in connection with FIGS. 1-5 and 10.

Those skilled in the art can clearly understand that, for convenience and simplicity of description, reference can be to the corresponding processes of various embodiments of the disclosed method described above for the specific working process of the systems, devices and units described above can be referred.

In various embodiments provided herein, it should be understood that, the disclosed system, media and method can be realized through other ways. The disclosed embodiments of the present disclosure are merely illustrative. For example, the division of units is merely a division of logical functions which may be divided by another way in the actual implementation. As another example, multiple units or components can be combined or be integrated into another system. Some features can be ignored, or not be executed. At another point, the illustrated or discussed mutual coupling, direct coupling, or communicating connection can be coupled or connected through electrical, mechanical, or other type of communication interfaces.

A unit described as a separate member may be or may not be physically separated. A component illustrated as a unit may be or may not be a physical unit. A unit can be located in one place, or be distributed to multiple network elements. According to actual needs, a part of or all of the units can be selected to realize the purpose of disclosed subject matter.

Further, various functional units in the various embodiments of the disclosed subject matter can be integrated in a processing unit, or can be separate physical units. Two or more functional units can also be integrated in one unit.

If the functions are implemented as software functional units, and being used or sold as a standalone product, the product can be stored in a computer readable storage medium. Based on this understanding, the technical solutions consistent with the disclosure can be embodied in a form of a computer software product.

The computer software product can be stored in a storage medium, including multiple instructions to instruct a computer device, such as a hardware processor, a personal computer, a server, or a network equipment, to perform all or part of a method consistent with the disclosure, such as one of the above-described methods. The aforementioned storage media can include: U disk, removable hard disk, read only memory (ROM), random access memory (RAM), floppy disk, CD-ROM, or any other suitable medium that can store program codes.

The provision of the examples described herein (as well as clauses phrased as "such as," "e.g.," "including," or the like) should not be interpreted as limiting the disclosure to the specific examples; rather, the examples are intended to illustrate only some of many possible aspects.

Although the present disclosure has been described and illustrated in the foregoing illustrative embodiments, it is understood that the present disclosure has been made only by way of example, and that numerous changes in the details of embodiment of the present disclosure can be made without departing from the spirit and scope of the present disclosure. Features of the disclosed embodiments can be combined and rearranged in various ways. Without departing from the spirit and scope of the present disclosure, modifications, equivalents, or improvements to the present disclosure are conceivable to those skilled in the art and are intended to be encompassed within the scope of the present disclosure.

What is claimed is:

1. A method for voice recognition, comprising:
acquiring, through a processor, a sound input;
in response to receiving the sound input, sending, through the processor, the sound input to a plurality of recognition engines different from each other and configured to recognize the sound input in parallel to each generate one of a plurality of feedback results;
obtaining, through the processor, the plurality of feedback results from the plurality of recognition engines; and
determining, through the processor, a recognition result of the sound input based on a comparison and analysis result of the plurality of feedback results, including:

comparing and analyzing, through the processor, the plurality of feedback results according to a set of rules;

in response to determining that the plurality of feedback results include no identical feedback result, further determining, through the processor, whether a user modification instruction is received within a preset time period, the user modification instruction instructing to modify one feedback result of the plurality of feedback results; and in response to receiving the user modification instruction, determining, through the processor, the recognition result of the sound input based on the user modification instruction.

2. The method of claim 1, wherein obtaining the plurality of feedback results includes:

obtaining, through the processor, a first feedback result generated by a first recognition engine based on the sound input; and obtaining, through the processor, a second feedback result generated by a second recognition engine different from the first recognition engine based on the sound input, wherein:

the plurality of feedback results include the first feedback result and the second feedback result, and the plurality of recognition engines include the first recognition engine and the second recognition engine.

3. The method of claim 2, wherein:

sending the sound input to the plurality of recognition engines includes sending, through the processor, the sound input to a plurality of servers, the plurality of servers including the plurality of recognition engines, and obtaining the plurality of feedback results further includes receiving, through the processor, the plurality of feedback results from the plurality of servers, respectively.

4. The method of claim 3, wherein sending the sound input to the plurality of servers includes:

sending, through the processor, the sound input to a first server including the first recognition engine; and sending, through the processor, the sound input to a second server including the second recognition engine, the second server being different from the first server; and receiving the plurality of feedback results from the plurality of servers includes receiving, through the processor, the first feedback result from the first server and the second feedback result from the second server.

5. The method of claim 2, further comprising:

determining, through the processor, at least one target recognition engine from the plurality of recognition engines, wherein a number of the at least one target recognition engine is smaller than a number of the plurality of recognition engines.

6. The method of claim 5, wherein the sound input is a first sound input, the method further comprising:

acquiring, through the processor, a second sound input;

obtaining, through the processor, a third feedback result generated by the at least one target recognition engine based on the second sound input; and determining, through the processor, a recognition result of the second sound input based on the third feedback result.

7. The method of claim 5, wherein determining the at least one target recognition engine includes:

performing, through the processor, an analyzing process on the plurality of feedback results according to an engine determination strategy; and selecting, through the processor, the at least one target recognition engine from the plurality of recognition engines based on the analyzing process.

8. The method of claim 7, wherein performing the analyzing process includes:

determining, through the processor, evaluation results for the plurality of recognition engines based on the plurality of feedback results; and ranking, through the processor, the plurality of recognition engines based on the evaluation results.

9. The method of claim 8, further comprising:

performing, through the processor, a training process including a plurality of analyzing processes corresponding to a plurality of training sound inputs, respectively, wherein determining the at least one target recognition engine includes determining, through the processor, the at least one target recognition engine based on a ranking of the plurality of recognition engines after the training process.

10. The method of claim 8, wherein determining the evaluation results for the plurality of recognition engines includes:

determining, through the processor, whether the plurality of feedback results include at least one identical feedback result;

in response to determining that the plurality of feedback results include at least one identical feedback result, selecting, through the processor, one identical feedback result having a largest number of occurrence times as the recognition result of the sound input.

11. The method of claim 10, wherein determining the evaluation results for the plurality of recognition engine further includes:

in response to determining that the plurality of feedback results do not include at least one identical feedback result, randomly selecting, through the processor, one of the feedback results as the recognition result of the sound input.

12. The method of claim 10, wherein determining the evaluation results for the plurality of recognition engines further includes:

in response to determining that the plurality of feedback results do not include at least one identical feedback result, determining, through the processor, if a user instruction for selecting a feedback result is received;

in response to determining that the user instruction is received, determining, through the processor, the feedback result selected by the user instruction as the recognition result of the sound input; and in response to determining that the user instruction is not received, randomly selecting, through the processor, a feedback result as the recognition result of the sound input.

13. The method of claim 12, wherein determining the evaluation results for the plurality of recognition engines further includes:

applying, through the processor, a positive evaluation to at least one of the recognition engines that matches the recognition result of the sound input.

14. The method of claim 13, wherein determining the evaluation results for the plurality of recognition engines further includes:

applying, through the processor, a negative evaluation to at least one of the recognition engines that does not match the recognition result of the sound input.

15. The method of claim 5, further comprising:

sharing, through the processor, identification information and auxiliary information of the at least one target recognition engine with an electronic device.

16. A system for voice recognition, comprising:

a hardware processor; and a memory which stores instructions for execution by the hardware processor to:

acquire a sound input;

in response to receiving the sound input, send the sound input to a plurality of recognition engines and configured to recognize the sound input in parallel to each generate one of a plurality of feedback results;

obtain the plurality of feedback results from the plurality of recognition engines; and determine a recognition result of the sound input based on a comparison and analysis result of the plurality of feedback results, including:

compare and analyze the plurality of feedback results according to a set of rules;

in response to determining that the plurality of feedback results include no identical feedback result, further determine whether a user modification instruction is received within a preset time period, the user modification instruction instructing to modify one feedback result of the plurality of feedback results; and in response to receiving the user modification instruction, determine the recognition result of the sound input based on the user modification instruction.

17. The system of claim 16, wherein the memory further stores instructions for execution by the hardware processor to:

obtain a first feedback result generated by a first recognition engine based on the sound input; and obtain a second feedback result generated by a second recognition engine different from the first recognition engine based on the sound input, wherein:

the plurality of feedback results include the first feedback result and the second feedback result, and the plurality of recognition engines include the first recognition engine and the second recognition engine.

18. The system of claim 17, wherein the memory further stores instructions for execution by the hardware processor to:

send the sound input to a plurality of servers, the plurality of servers including the plurality of recognition engines; and receive the plurality of feedback results from the plurality of servers, respectively.

19. The system of claim 18, wherein the memory further stores instructions for execution by the hardware processor to:

send the sound input to a first server including the first recognition engine;

send the sound input to a second server including the second recognition engine, the second server being different from the first server; and receive the first feedback result from the first server and the second feedback result from the second server.

20. A non-transitory computer-readable medium storing computer-executable instructions for execution by a hardware processor to:

acquire a sound input;

in response to receiving the sound input, send the sound input to a plurality of recognition engines and configured to recognize the sound input in parallel to each generate one of a plurality of feedback results;

obtain the plurality of feedback results from the plurality of recognition engines; and determine a recognition result of the sound input based on a comparison and analysis result of the plurality of feedback results, including:

compare and analyze the plurality of feedback results according to a set of rules;

in response to determining that the plurality of feedback results include no identical feedback result, further determine whether a user modification instruction is received within a preset time period, the user modification instruction instructing to modify one feedback result of the plurality of feedback results; and in response to receiving the user modification instruction, further determine the recognition result of the sound input based on the user modification instruction.

\* \* \* \* \*